(12) United States Patent
Wu

(10) Patent No.: US 7,429,438 B2
(45) Date of Patent: Sep. 30, 2008

(54) METHOD OF FABRICATING COLOR FILTER

(75) Inventor: Yi-Tyng Wu, Chiayi (TW)

(73) Assignee: United Microelectronics Corp., Hsinchu (TW)

( * ) Notice: Subject to any disclaimer, the term of this patent is extended or adjusted under 35 U.S.C. 154(b) by 0 days.

(21) Appl. No.: 11/553,475

(22) Filed: Oct. 27, 2006

(65) Prior Publication Data

US 2008/0102384 A1     May 1, 2008

(51) Int. Cl.
*G02B 5/20* (2006.01)
(52) U.S. Cl. .............................. 430/7; 430/198; 430/330
(58) Field of Classification Search ........................ None
See application file for complete search history.

(56) References Cited

U.S. PATENT DOCUMENTS 5,510,215 A * 4/1996 Prince et al. ................... 430/7
5,658,612 A * 8/1997 Li et al. ....................... 427/107
5,930,046 A * 7/1999 Solberg et al. .............. 359/580

FOREIGN PATENT DOCUMENTS

JP          10-115711 A   *   5/1998

* cited by examiner

*Primary Examiner*—John A. McPherson
(74) *Attorney, Agent, or Firm*—Jianq Chyun IP Office

(57) ABSTRACT

A method of fabricating a color filter is provided, which includes the following steps. First, a loose composite film is formed. Next, the loose composite film is patterned to form a patterned composite film. Then, a treatment process is performed to dense the patterned composite film, thereby a color filter is formed.

19 Claims, 4 Drawing Sheets

METHOD OF FABRICATING COLOR FILTER

BACKGROUND OF THE INVENTION

1. Field of Invention

The present invention relates to a semiconductor manufacturing process, and more particularly to a method of fabricating a color filter.

2. Description of Related Art

Nowadays, the multimedia technology is quite advanced, which mostly benefits from the rapid progress of semiconductor elements or display devices. As for the display, the liquid crystal display having excellent characteristics such as high definition, good high space utilization efficiency, low power consumption and radiation free has gradually become the main stream of the market.

The LCD mainly comprises a display panel and a backlight module, wherein the display panel comprises an active matrix display substrate and a color filter. The color filter is used to filter the light emitted from the backlight module, such that the LCD is provided with the full color function.

Generally, the color filter is classified into the filter with a single film layer and the filter with a composite film structure. Generally speaking, the filter with a composite film structure is formed by alternately stacking film layers with different refraction indexes, so as to achieve the object of filtering a particular wavelength. In order to make the optical characteristics of a composite film meet the requirements, its fabricating temperature is usually higher than 150° C. However, the composite film formed under such a high temperature environment has a dense structure, which is hard to be etched. In addition, the thickness of the composite film is up to 8000 Å (800 nm), thus the etching process is quite time consuming, which significantly influences the production capacity.

SUMMARY OF THE INVENTION

The present invention is to provide a method of fabricating a color filter, wherein the composite film used for fabricating a filter has a dense structure, and also has desirable optical characteristics, which is easy to be etched, thus effectively reducing the time for etching.

The present invention provides a method of fabricating a color filter. A composite film at a lower temperature is formed. Next, an annealing process at a higher temperature is performed.

According to an embodiment of the present invention, the lower temperature is higher than 0° C. and lower than 150° C. The higher temperature is between 300° C. and 900° C., or between 300° C. and 400° C.

According to an embodiment of the present invention, the gas used in the annealing process is one selected from a group consisting of nitrogen gas, nitrogen gas and hydrogen gas, ammonia gas, ammonia gas and hydrogen gas. The time duration for the annealing process is between 10 minutes and 4 hours.

According to an embodiment of the present invention, the composite film comprises a stacked layer formed by alternately stacking titanium oxide layers and silicon oxide layers, a stacked layer formed by alternately stacking tantalic oxide layers and silicon oxide layers or a stacked layer formed by alternately stacking zinc sulfide layers and magnesium fluoride layers.

The present invention further provides a method of fabricating a color filter. A loose composite film on a substrate is formed. Next, the loose composite film to form a patterned composite film is patterned. Thereafter, a treatment process to dense the patterned first composite film is performed, thus a filter is formed.

According to an embodiment of the present invention, the loose composite film is formed at a lower temperature, and the treatment process is performed at a higher temperature.

According to an embodiment of the present invention, the lower temperature is higher than 0° C. and lower than 150° C. The higher temperature is between 300° C. and 900° C., or between 300° C. and 400° C.

According to an embodiment of the present invention, the treatment process comprises an annealing process. The gas used in the annealing process is one selected from a group consisting of nitrogen gas, nitrogen gas and hydrogen gas, ammonia gas, ammonia gas and hydrogen gas. The time duration for the annealing process is between 10 minutes and 4 hours.

According to an embodiment of the present invention, the loose composite film comprises a stacked layer formed by alternately stacking titanium oxide layers and silicon oxide layers, a stacked layer formed by alternately stacking tantalic oxide layers and silicon oxide layers or a stacked layer formed by alternately stacking zinc sulfide layers and magnesium fluoride layers.

The present invention further provides a method of fabricating a color filter, which comprises the following steps. A loose first composite film is formed on a substrate and then patterned to form a patterned first composite film. Next, a patterned second composite film and a patterned third composite film are formed on the substrate according to the above method. Then, a treatment process is performed to dense the patterned first composite film, the patterned second composite film and the patterned third composite film, so as to respectively form a first filter, a second filter and a third filter.

According to an embodiment of the present invention, the loose first composite film, the loose second composite film and the loose third composite film are formed at a lower temperature, and the treatment process is performed at a higher temperature.

According to an embodiment of the present invention, the lower temperature is higher than 0° C. and lower than 150° C. The higher temperature is between 300° C. and 900° C., or between 300° C. and 400° C.

According to an embodiment of the present invention, the treatment process comprises an annealing process. The gas used in the annealing process is one selected from a group consisting of nitrogen gas, nitrogen gas and hydrogen gas, ammonia gas, ammonia gas and hydrogen gas. The time duration for the annealing process is between 10 minutes and 4 hours.

According to an embodiment of the present invention, the loose first composite film, the loose second composite film and the loose third composite film are one of a red film layer, a green film layer or a blue film layer respectively.

According to an embodiment of the present invention, the loose first composite film, the loose second composite film and the loose third composite film respectively comprises a stacked layer formed by alternately stacking titanium oxide layers and silicon oxide layers, a stacked layer formed by alternately stacking tantalic oxide layers and silicon oxide layers or a stacked layer formed by alternately stacking zinc sulfide layers and magnesium fluoride layers.

The composite film is relatively loose, which is easy to be etched when patterning, thus the present invention can improve the etching rate and reduce the time for the manufacturing process. The annealing process performed after the etching process can dense the loose composite films, thus achieving the desirable material characteristics.

In order to make the aforementioned and other objects, features and advantages of the present invention comprehensible, preferred embodiments accompanied with figures are described in detail below.

It is to be understood that both the foregoing general description and the following detailed description are exemplary, and are intended to provide further explanation of the invention as claimed.

BRIEF DESCRIPTION OF THE DRAWINGS

The accompanying drawings are included to provide a further understanding of the invention, and are incorporated in and constitute a part of this specification. The drawings illustrate embodiments of the invention and, together with the description, serve to explain the principles of the invention.

DESCRIPTION OF EMBODIMENTS

Figure 1:
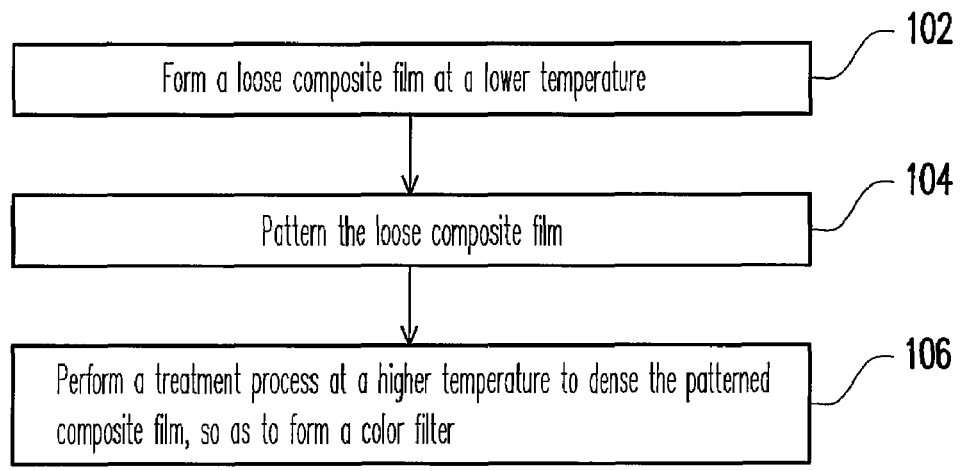
FIG. 1 is a sectional view of the flow for fabricating a color filter according to an embodiment of the present invention.

Referring to FIG. 1, the method of fabricating a color filter according to the present invention comprises: forming a loose composite film at a lower temperature (Step 102), and performing a treatment process, e. g., a annealing process, at a higher temperature to dense the composite film, so as to form a desirable color filter (Step 106). The loose composite film is, for example, a stacked layer formed by alternately stacking titanium oxide layers and silicon oxide layers, a stacked layer formed by alternately stacking tantalic oxide layers and silicon oxide layers or a stacked layer formed by alternately stacking zinc sulfide layers and magnesium fluoride layers. The temperature for forming the loose composite film is, for example, higher than 0° C. and lower than 150° C. Preferably, the temperature for the annealing process is between 0° C. and 100° C. The annealing process can reduce the dangling bond in the structure, so as to dense the structure. The temperature for the annealing process varies depending on the application fields of the color filter. In an embodiment, the process for manufacturing the color filter belongs to a front-end processes, and the temperature for the annealing process is, for example, between 300° C. and about 900° C. In another embodiment, the process for manufacturing the color filter belongs to a back-end processes, and the temperature for the annealing process is, for example, between 300° C. and about 400° C. The gas used in the annealing process is one selected from a group consisting of nitrogen gas, nitrogen gas and hydrogen gas, ammonia gas, ammonia gas and hydrogen gas. The time duration for the annealing process is between 10 minutes and 4 hours.

Referring to FIG. 1, during the actual application, the Step 104 of etching the composite film can be arranged after the Step 102 of forming the loose composite film, and before the Step 106 of performing the annealing process. Since it is easy for the loose composite film to be etched, the etching rate of the composite film is significantly enhanced. In an embodiment, the etching rate of the loose composite film is 1600 Å/minute, which is significantly increased by 15%, compared with the etching rate of 1400 Å/minute for the composite film conventionally formed at a higher temperature.

It is proved by experiments that, although the spectral characteristics of the loose composite film formed at a lower temperature are different from that of the composite film conventionally formed at a higher temperature, after the etching process, the performed annealing process indeed enables the spectral characteristics of the finally formed composite film to be substantially the same as that of the composite film conventionally formed at higher temperature, and thereby improving the light transmittance for particular wavelength. In an embodiment, after the composite film has been annealed, its light transmittance for particular wavelength is increased from 99.1% to 99.7%.

The color filter of the present invention can be used to fabricate an infrared filter, an ultraviolet filter, an RGB (red, green, blue) color filter or a CYM (cyan, yellow, magenta) color filter. The RGB color filter is taken as an example for illustrating the present invention, but not intended to limit the present invention.

FIGS. 2A-2G are sectional views of the flow for fabricating the color filter according to an embodiment of the present invention. First, referring to FIG. 2A, a substrate 200 is provided, which is, for example, a silicon substrate; and an ordinary semiconductor device (not shown) is formed on the substrate 200. Then, a loose composite film 202 is formed at a lower temperature, for example, higher than 0° C. and lower than 150° C. The composite film 202 can be a stacked layer with the thickness of about 8000 Å formed by alternately stacking film layers with different refraction indexes by physical vapor deposition or chemical vapor deposition. For example, the composite film 202 is formed by, for example, repeatedly forming each film layer on the substrate 200 sequentially from the film layer with a low refraction index to the one with a high refraction index. Alternatively, in another embodiment, the composite film 202 is also formed by repeatedly forming each film layer on the substrate 200 sequentially from the film layer with a high refraction index to the one with a low refraction index. The composite film 202 is, for example, a stacked layer formed by alternately stacking titanium oxide layers and silicon oxide layers, a stacked layer formed by alternately stacking tantalic oxide layers and silicon oxide layers or a stacked layer formed by alternately stacking zinc sulfide layers and magnesium fluoride layers. The composite film 202 is one of a red film layer, a green film layer or a blue film layer. In this embodiment, the composite film 202 is illustrated as a red film layer, for example.

Figure 2A:
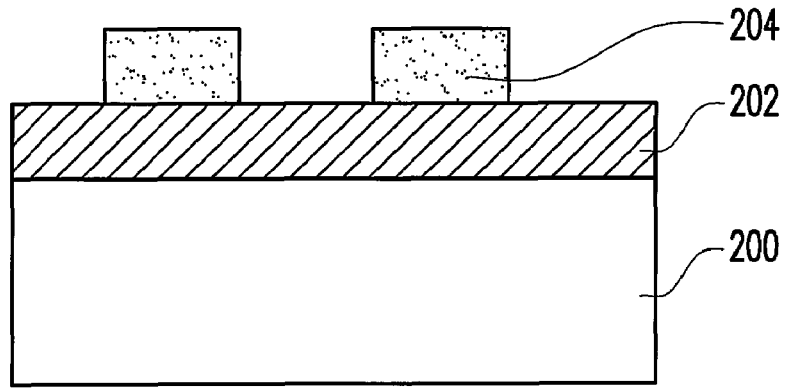
FIGS. 2A-2G are sectional views of the flow for fabricating a color filter according to an embodiment of the present invention.
Figure 2B:
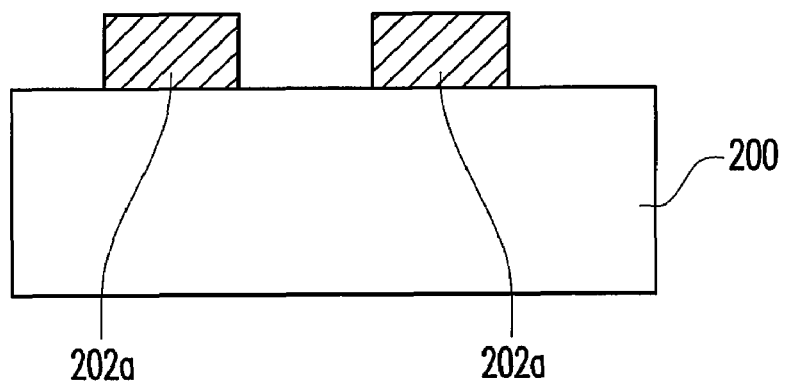

Then, referring to FIG. 2B, a patterning process is performed for the composite film 202 to form a patterned composite film 202a. The patterning process comprises: forming a patterned photoresist layer 204 on the composite film 202, and then performing an etching process to pattern the composite film 202. The etching process uses, for example, a gas mixture comprised of chlorofluoro carbon or carbon fluoride being mixed with the chlorine gas as the etching gas.

Figure 2C:
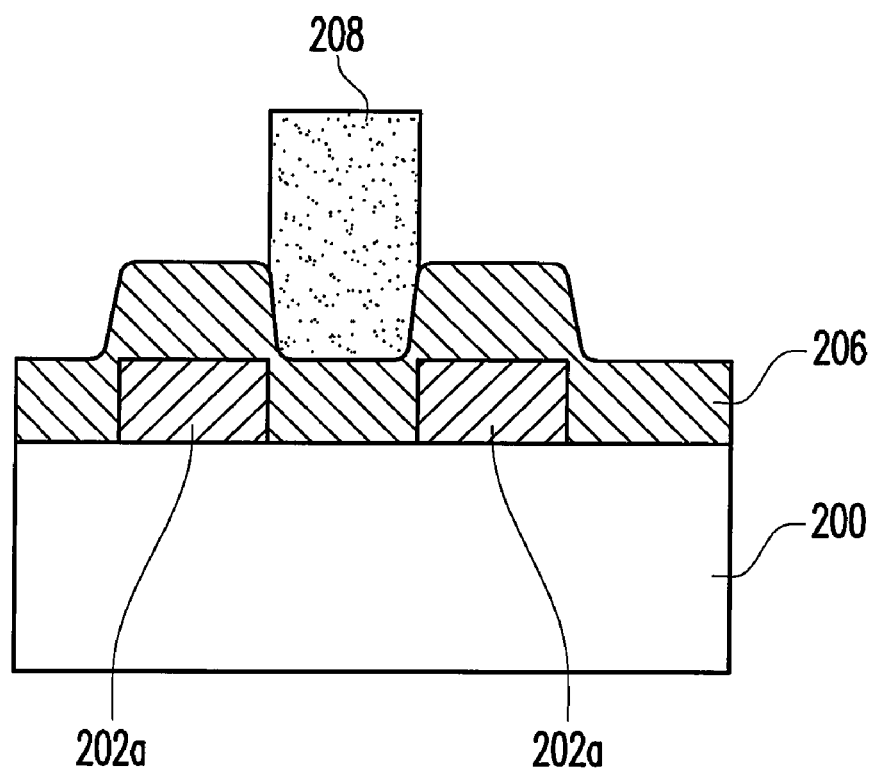

Referring to FIG. 2C, the patterned photoresist layer 204 is removed. The method for removing the photoresist layer 204 is, for example, oxygen plasma ashing. Next, a loose composite film 206 is formed on the substrate 200. The composite film 206 is, for example, a green film layer, and its manufacturing method and materials can be known with reference to that of the composite film 202, which will not be described herein any more. Then, a patterned photoresist layer 208 is formed on the composite film 206, so as to cover the position predetermined for forming the green filter.

Figure 2D:
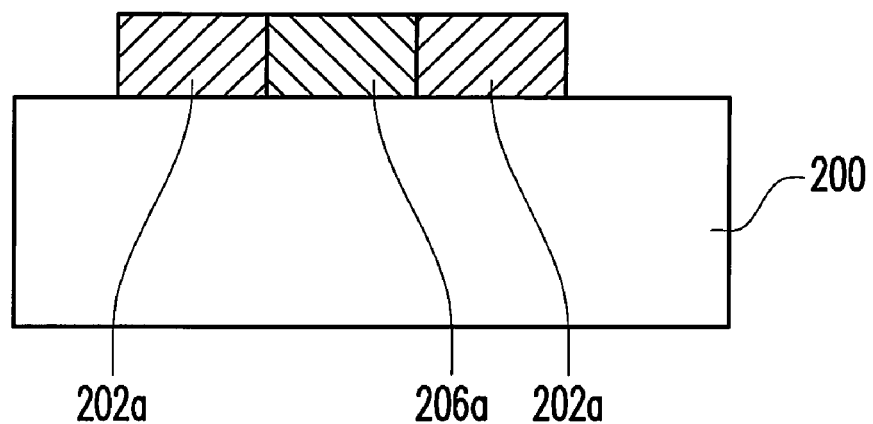

Then, referring to FIG. 2D, an etching process is performed to the composite film 206 to form a patterned composite film 206a. The etching process uses, for example, a gas mixture comprised of chlorofluoro carbon or carbon fluoride being mixed with the chlorine gas as the etching gas. Next, the patterned photoresist layer 208 is removed. The method for removing the photoresist layer 208 is, for example, oxygen plasma ashing.

Figure 2E:
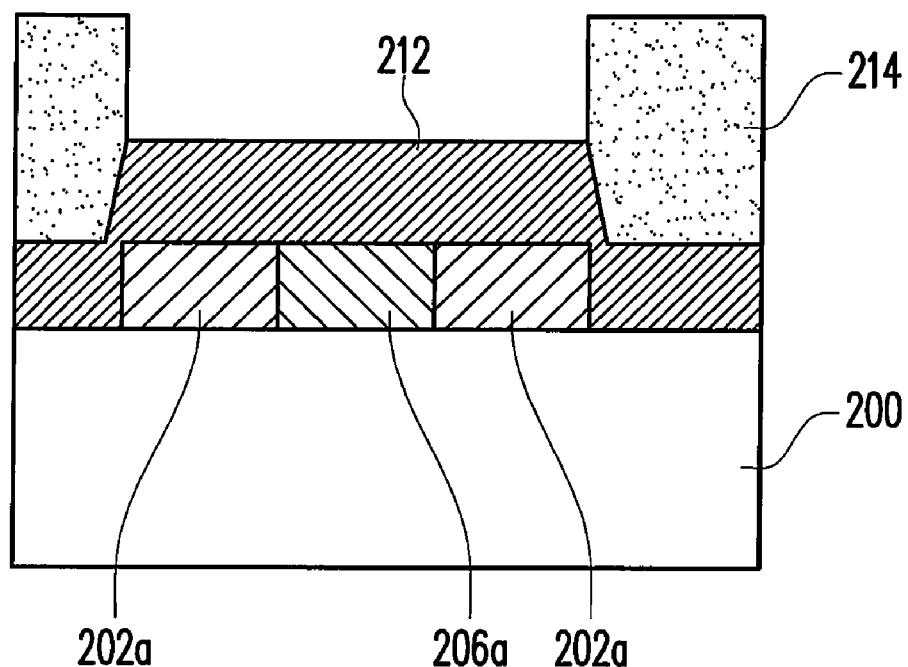

Referring to FIG. 2E, a loose composite film 212 is formed on the substrate 200. The composite film 212 is, for example, a blue film layer and the manufacturing method and its material can be known with reference to that of the composite film 202, which will not be described herein any more. Next, a patterned photoresist layer 214 is formed on the composite film 212, so as to cover the position predetermined for forming the blue filter.

Figure 2F:
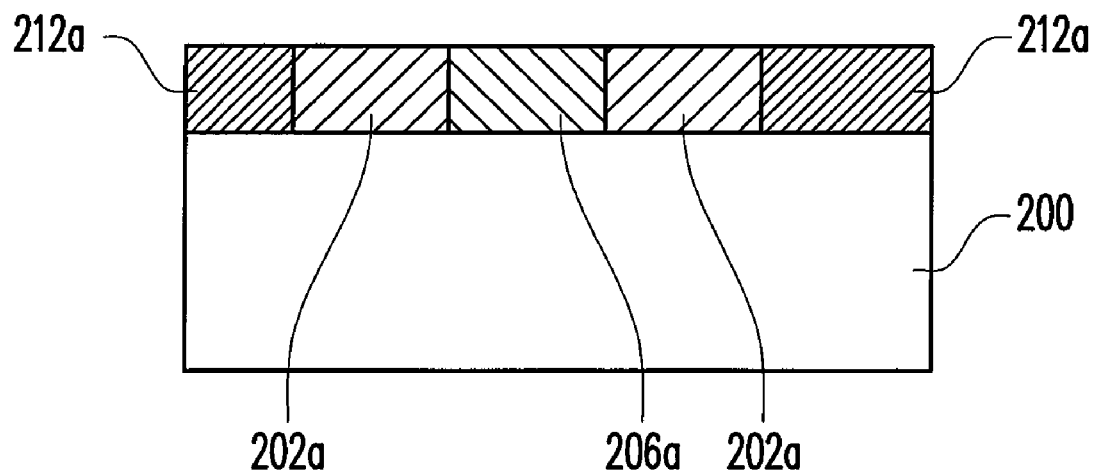

Then, referring to FIG. 2F, an etching process is performed to the composite film 212 to form a patterned composite film 212a. The etching process uses, for example, a gas mixture comprised of chlorofluoro carbon or carbon fluoride being mixed with the chlorine gas as the etching gas. Then, the patterned photoresist layer 214 is removed. The method for removing the photoresist layer 214 is, for example, oxygen plasma ashing.

Figure 2G:
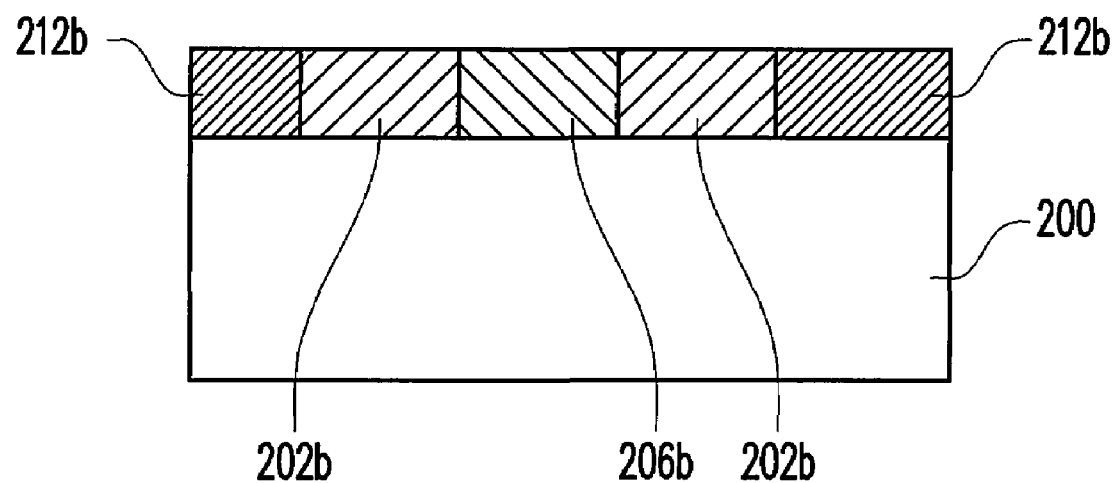

Then, referring to FIG. 2G, a treatment process, e.g., annealing process, is performed to the patterned composite films 202a, 206a and 212a at a higher temperature environment, such that the patterned composite films 202a, 206a and 212a become dense filters 202b, 206b and 212b. When the process of fabricating the filter belongs to a front-end processes, the temperature for annealing is, for example, between 300° C. and 900° C. In another embodiment, when the process of fabricating the filter belongs to a back-end processes, the temperature for annealing is, for example, between 300° C. and 400° C. The gas used in the annealing process is one selected from a group consisting of nitrogen gas, nitrogen gas and hydrogen gas, ammonia gas, ammonia gas and hydrogen gas. The time duration for the annealing process is between 10 minutes and 4 hours.

It should be mentioned that, the sequence for fabricating the red filter, the green filter and the blue filter is not limited to be the same as that mentioned in the above embodiment, which can be varied as desired.

It will be apparent to those skilled in the art that various modifications and variations can be made to the structure of the present invention without departing from the scope or spirit of the invention. In view of the foregoing, it is intended that the present invention cover modifications and variations of this invention provided they fall within the scope of the following claims and their equivalents.

What is claimed is:

1. A method of fabricating a color filter, comprising:
   forming a loose composite film over a substrate;
   patterning the loose composite film to form a patterned composite film; and
   performing a treatment process to dense the patterned composite film, so as to form a filter.

2. The method of fabricating a color filter as claimed in claim 1, wherein:
   the loose composite film is formed at a lower temperature; an
   the treatment process is performed at a higher temperature.

3. The method of fabricating a color filter as claimed in claim 2, wherein the lower temperature is higher than 0° C. and lower than 150° C.

4. The method of fabricating a color filter as claimed in claim 2, wherein the higher temperature is between 300° C. and 900° C.

5. The method of fabricating a color filter as claimed in claim 2, wherein the higher temperature is between 300° C. and 400° C.

6. The method of fabricating a color filter as claimed in claim 2, wherein the treatment process comprises an annealing process.

7. The method of fabricating a color filter as claimed in claim 6, wherein a gas used in the annealing process is one selected from a group consisting of nitrogen gas, nitrogen gas and hydrogen gas, ammonia gas, ammonia gas and hydrogen gas.

8. The method of fabricating a color filter as claimed in claim 6, wherein the time duration for the annealing process is between 10 minutes and 4 hours.

9. The method of fabricating a color filter as claimed in claim 2, wherein the loose composite film comprises a stacked layer formed by alternately stacking titanium oxide layers and silicon oxide layers, a stacked layer formed by alternately stacking tantalic oxide layers and silicon oxide layers or a stacked layer formed by alternately stacking zinc sulfide layers and magnesium fluoride layers.

10. A method of fabricating a color filter, comprising:
    forming a loose first composite film on a substrate;
    patterning the loose first composite film to form a patterned first composite film;
    forming a loose second composite film on the substrate;
    patterning the loose second composite film to form a patterned second composite film;
    forming a loose third composite film on the substrate;
    patterning the loose third composite film to form a patterned third composite film; and
    performing a treatment process to dense the patterned first composite film, the patterned second composite film and the patterned third composite film, so as to form a first filter, a second filter and a third filter respectively.

11. The method of fabricating a color filter as claimed in claim 10, wherein:
    the loose first composite film, the loose second composite film and the loose third composite film are formed at a lower temperature; and
    the treatment process is performed at a higher temperature.

12. The method of fabricating a color filter as claimed in claim 11, wherein the lower temperature is higher than 0° C. and lower than 150° C.

13. The method of fabricating a color filter as claimed in claim 11, wherein the higher temperature is between 300° C. and 900° C.

14. The method of fabricating a color filter as claimed in claim 11, wherein the higher temperature is between 300° C. and 400° C.

15. The method of fabricating a color filter as claimed in claim 10, wherein the treatment process comprises an annealing process.

16. The method of fabricating a color filter as claimed in claim 15, wherein a gas used in the annealing process is one selected from a group consisting of nitrogen gas, nitrogen gas and hydrogen gas, ammonia gas, ammonia gas and hydrogen gas.

17. The method of fabricating a color filter as claimed in claim 15, wherein the time duration for the annealing process is between 10 minutes and 4 hours.

18. The method of fabricating a color filter as claimed in claim 10, wherein the loose first composite film, the loose second composite film and the loose third composite film are one of a red film layer, a green film layer or a blue film layer respectively.

19. The method of fabricating a color filter as claimed in claim. 10, wherein the loose first composite film, the loose second composite film and the loose third composite film respectively comprise a stacked layer formed by alternately stacking titanium oxide layers and silicon oxide layers, a stacked layer formed by alternately stacking tantalic oxide layers and silicon oxide layers or a stacked layer formed by alternately stacking zinc sulfide layers and magnesium fluoride layers.

* * * * *